W. JURY.
FOOTING FOR AUTOMOBILES.
APPLICATION FILED MAY 25, 1922.

1,425,101.

Patented Aug. 8, 1922.

Inventor,
William Jury,
By _____,
Attorney.

UNITED STATES PATENT OFFICE.

WILLIAM JURY, OF LANSING, MICHIGAN.

FOOTING FOR AUTOMOBILES.

1,425,101.	Specification of Letters Patent.	Patented Aug. 8, 1922.

Application filed May 25, 1922. Serial No. 563,687.

*To all whom it may concern:*

Be it known that I, WILLIAM JURY, a citizen of the United States of America, and resident of Lansing, in the county of Ingham and State of Michigan, have invented certain new and useful Improvements in Footing for Automobiles, of which the following is a specification.

This invention relates to a device termed a "truck footing", and is intended for use in assisting an operator to dislodge an automobile when the traction wheels thereof are without sufficient frictional engagement with the roadbed to cause the automobile to be driven when the traction wheels are rotating, as occurs when the wheels are skidding or spinning.

It is an object of this invention to provide an attachment which may be connected to the tire or rim of an automobile and which will prove effective in causing the automobile to run out of a soft roadbed or the like; and it is a further object of this invention to produce a device of the character indicated which can be constructed inexpensively and which is portable and capable of being stored in a compartment of the automobile body.

It is a further object of this invention to produce a footing for wheels of automobiles which is strong and durable, and with which a chain may be associated for winding on the tire of a wheel and from which the chain may be readily disassociated as the automobile travels from the footing, thus making it possible for an operator to gain momentum, while traveling on the footing, sufficient to carry him through adjacent or other bad spots in the road after leaving the footing.

It is a still further object of this invention to produce a foldable footing, associated with anchoring elements which will prevent the footing from slipping while the device is being used.

With the foregoing and other objects in view, the invention consists in the details of construction, and in the arrangement and combination of parts to be hereinafter more fully set forth and claimed.

In describing the invention in detail, reference will be had to the accompanying drawing forming part of this application wherein like characters denote corresponding parts in the several views, and in which—

Figure 1:
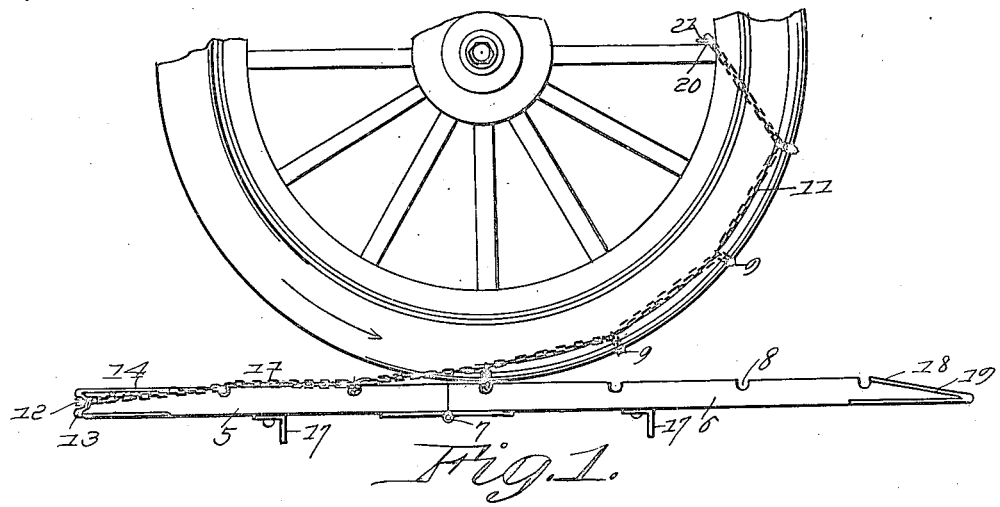
Figure 1 illustrates a view in elevation showing a device embodying the invention in use.
Figure 2:
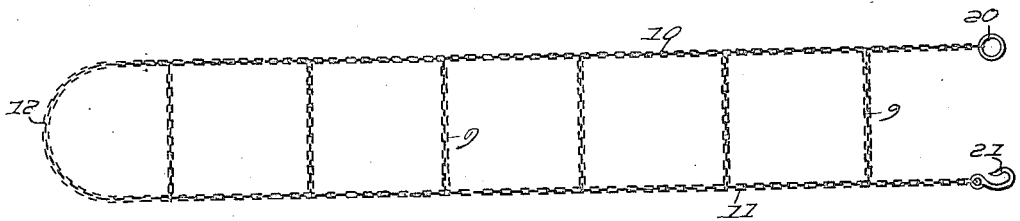
Figure 2 illustrates a plan view of the chain.
Figure 3:
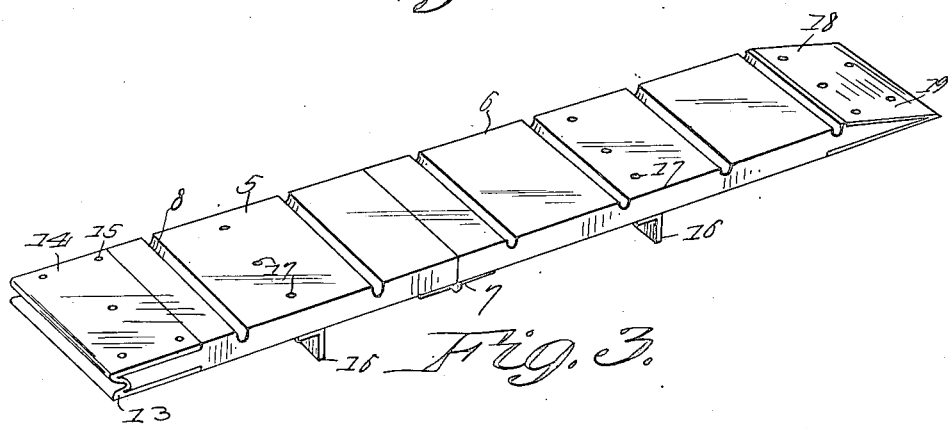
Figure 3 illustrates a perspective view of the base or footing proper.

In these drawings 5 and 6 denote sections of the base or footing and they are pivotally connected together by a hinge 7 applied to its under side, and this hinge is intended to permit the sections to be folded with their under sides as they appear in the drawing, parallel to each other, in order that the footing will occupy comparatively small space.

There are a series of transversely disposed slots or recesses 8 in the upper face of the footing when in operative position and these form seats for the cross chains 9 that connect the side chain sections 10 and 11, the side chain sections having a loop 12 forming a continuation of the sides, and this loop is intended to embrace an end of the footing and to lie in a seat 13 formed in the end of said footing.

A reinforcing plate 14 embraces the end of the footing and it has parallel portions which are secured to the upper and lower sides of the footing by fastenings 15 such as rivets or the like.

Shoes or cleats 16 are also secured to the footing by fastenings 17 such as rivets, and these shoes are intended to be imbedded in the roadbed to such a degree as to prevent the movement of the footing longitudinally.

The end of the footing opposite the groove 13 is preferably inclined as shown at 18, and it is provided with a guard plate 19 that embraces the end in order that the footing will withstand strain incident to its use.

The ends of the side chains are preferably provided with a ring 20 and a hook 21 respectively and it is intended that the side chains shall be caused to embrace the rim and tire of an automobile and connected together in the manner shown in Fig. 1 with the loop portion of the chain engaging the recessed end of the footing, in order that when the automobile is driven and the wheels thereof rotate in the direction of the arrow of Fig. 1, the wheels will climb to the footing and travel thereon for its full length. If the wheels travel to such an extent that they pass beyond the end of the footing, the loop 12 will disengage from the end of the footing and the automobile wheels will be free to travel under its power and momentum to free it from that portion of the road in which traction was imperfect.

A device embodying the invention is comparatively inexpensive, whereas it has proven efficient and satisfactory in use, as will be appreciated by one skilled in the art.

Where the device is to be used for heavy duty trucks and the like, the hinge may be omitted, as a joint, of course, reduces the strength somewhat, and for heavy loads unless the coupling for the joint were made excessively heavy or made unusually strong, the durability of the device might be impaired.

I claim:

1. In a footing for automobiles, a base, a flexible element having a looped portion embracing one end of the base and side portions extending longitudinally of the base, and means for securing the ends of the side members to a rim of an automobile wheel.

2. In a footing for automobiles, a base having transversely disposed recesses, a flexible element having a looped portion engaging the end of the base and having side portions extending longitudinally of the said base, connections extending from one side to the other lying in the recesses of the base, and means on the ends of the said flexible member for anchoring the same to a rim of an automobile wheel.

3. In a footing for automobiles, a base, members on the under surface thereof for preventing movement of the base, a flexible member having a looped portion embracing one end of the base, the said flexible member having side portions extending longitudinally of the base, and means by which the ends of the side members may be connected to a rim of an automobile wheel.

4. In a footing for automobiles, a base, members on the under surface thereof for preventing movement of the base, a flexible member having a looped portion embracing one end of the base, the said flexible member having side portions extending longitudinally of the base, means by which the ends of the side members may be connected to a rim of an automobile wheel, and reinforcing plates for the ends of the said base.

5. In a footing for automobiles, a base on which an automobile wheel may run, adapted to have one end placed in proximity to the wheel, sections of flexible material projecting from the end of the base near the wheel, said sections of flexible material being positioned on each side of the wheel and having means by which the ends thereof may be connected to the rim of the wheel, and means for detachably connecting the said sections of flexible material near the end of said base remote from the said wheel.

WILLIAM JURY.